US008140060B2

(12) United States Patent
De Zen et al.

(10) Patent No.: US 8,140,060 B2
(45) Date of Patent: Mar. 20, 2012

(54) METHOD AND ARCHITECTURE TO DELIVER PRE-CUSTOMIZED BUSINESS CARD MULTIMEDIA CONTENTS THROUGH IMS-BASED PLMNS FOR IMPROVING THE EXISTING CALLING LINE IDENTIFICATION SERVICE

(75) Inventors: Giovanna De Zen, Milan (IT); Adrian Militaru, Arcore (IT); Alessandro Bernardi, Prato (IT)

(73) Assignee: Nokia Siemens Networks S.p.A., Cassina de Pecchi (MI) (IT)

( * ) Notice: Subject to any disclaimer, the term of this patent is extended or adjusted under 35 U.S.C. 154(b) by 487 days.

(21) Appl. No.: 12/278,723

(22) PCT Filed: Feb. 5, 2007

(86) PCT No.: PCT/EP2007/000942
§ 371 (c)(1),
(2), (4) Date: May 4, 2009

(87) PCT Pub. No.: WO2007/090587
PCT Pub. Date: Aug. 16, 2007

(65) Prior Publication Data
US 2009/0264112 A1    Oct. 22, 2009

(30) Foreign Application Priority Data
Feb. 10, 2006 (EP) .................................. 06425070

(51) Int. Cl.
*H04M 3/42* (2006.01)
(52) U.S. Cl. ..................... 455/415; 370/352; 370/356
(58) Field of Classification Search .................. None
See application file for complete search history.

(56) References Cited

U.S. PATENT DOCUMENTS
6,434,143 B1 *    8/2002    Donovan .................. 370/356
(Continued)

OTHER PUBLICATIONS
Mayerhofer A: "ENUM service 'vCard'" Internet Citation, (online) Nov. 8, 2005, pp. 1-4, XP002389077 Retrieved from the Internet: URL:www3.ietf.org/proceedings/05nov/slides/enum-3/enum-3.ppt> (retrieved on Jul. 6, 2006) * p. 1-p. 2 *.

(Continued)

*Primary Examiner* — Ajit Patel
(74) *Attorney, Agent, or Firm* — Laurence A. Greenberg; Werner H. Stemer; Ralph E. Locher

(57) ABSTRACT

An improved Calling Line Identification (CLI) service is implemented inside a cellular telephony network connected to the IMS platform for delivering IP-based multimedia services to the end users. The new architecture is based on a multimedia CLI-dedicated server (MM-CLI) connected to the IMS and the packet switched (PS) domain of the core network. The MM-CLI comprises: a Control server, media storage, and a web interface. The control server is devoted to handle the SIP signalizing flow including a SIP element called MESSAGE carrying in its body either the multimedia contents of the so-called business card or HTTP address link to retrieve the components of said multimedia contents. The media storage stores multimedia contents of the business cards and/or said HTTP address links according to respective user's profiles. The web interface web allows the end users to download the multimedia components of the business cards through the addressed HTTP links. The handsets include a client application for monitoring the line status of the caller and transmitting the SIP MESSAGE at the very initial instant of the call setup. The client further monitors both the line status of the callee and the incoming SIP stack for synchronizing the CLI information and either get or retrieve the multimedia components of the business card. A player internal to the user phone renders and plays the business cards.

15 Claims, 13 Drawing Sheets

U.S. PATENT DOCUMENTS

| | | | |
|---|---|---|---|
| 6,636,596 B1 * | 10/2003 | Gallant et al. | 379/220.01 |
| 6,678,735 B1 * | 1/2004 | Orton et al. | 709/230 |
| 6,741,586 B1 * | 5/2004 | Schuster et al. | 370/352 |
| 6,795,430 B1 * | 9/2004 | Ong et al. | 370/352 |
| 7,359,373 B2 * | 4/2008 | Kuusinen et al. | 370/352 |
| 2003/0055981 A1 | 3/2003 | Requena et al. | |
| 2003/0139172 A1 | 7/2003 | Lampela et al. | |
| 2004/0162094 A1 | 8/2004 | Riikonen et al. | |
| 2005/0083909 A1 | 4/2005 | Kuusinen et al. | |
| 2010/0279662 A1 * | 11/2010 | Kuusinen et al. | 455/412.2 |
| 2010/0309906 A1 * | 12/2010 | Ramachandran et al. | 370/352 |

OTHER PUBLICATIONS

Frank Dawson Lotus Development Corporation: "The vCard v3.0 XML DTD; draft-dawson-vcard-xml-dtd-00.txt;" IETF Standard-Working-Draft, Internet Engineering Task Force, IETF, CH, Jul. 19, 1998, pp. 1-13, XP015012282 ISSN: 0000-0004 * paragraph (Abstract)-paragraph (001.).

* cited by examiner

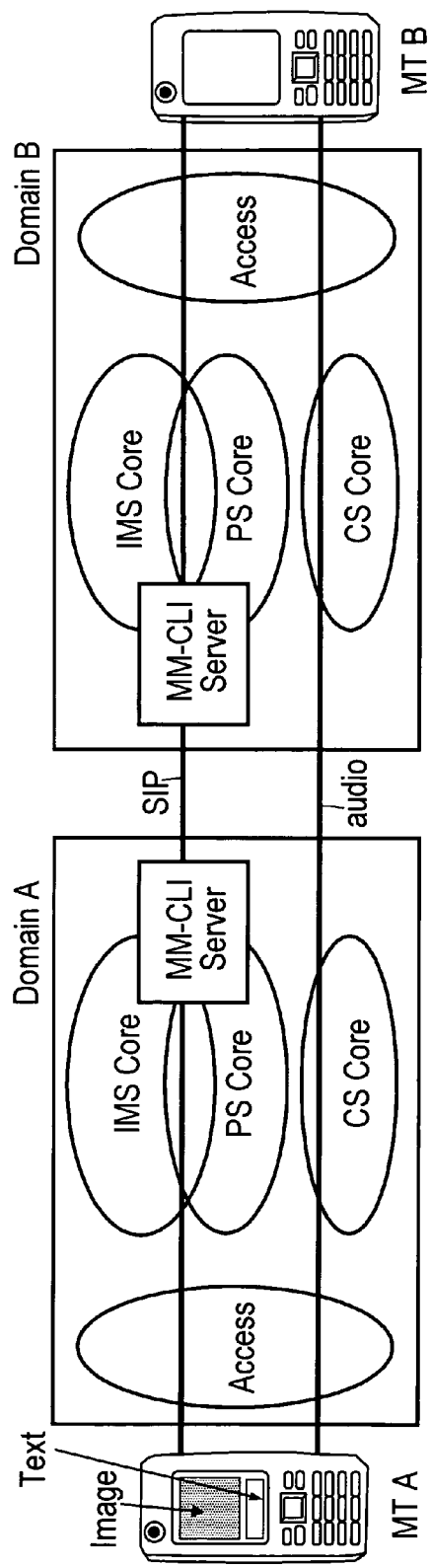
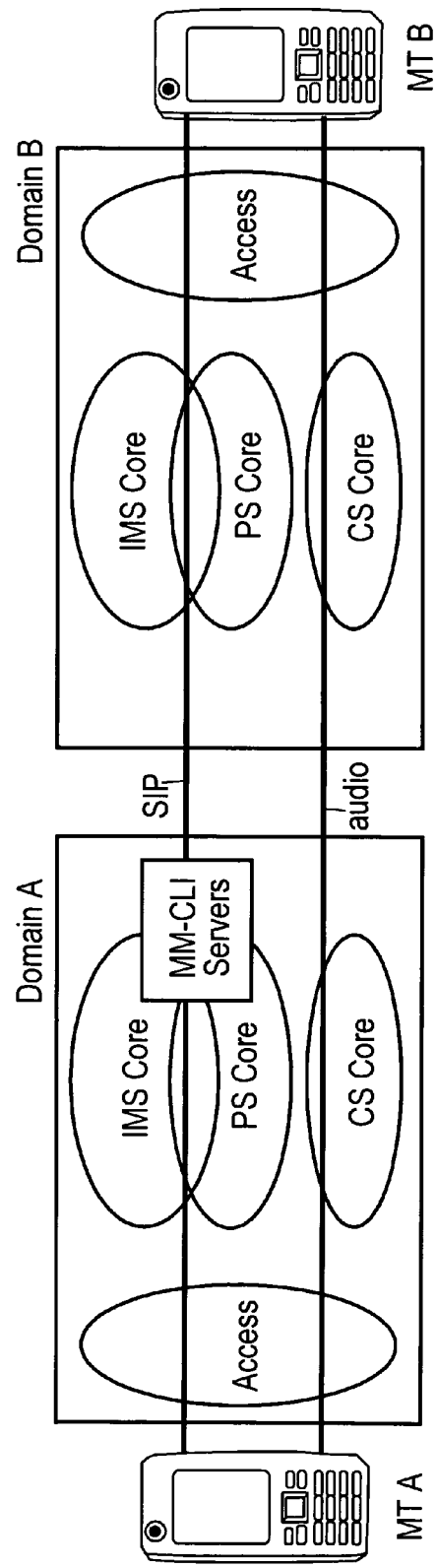
FIG. 3
FIG. 4

METHOD AND ARCHITECTURE TO DELIVER PRE-CUSTOMIZED BUSINESS CARD MULTIMEDIA CONTENTS THROUGH IMS-BASED PLMNS FOR IMPROVING THE EXISTING CALLING LINE IDENTIFICATION SERVICE

CLAIM FOR PRIORITY

This application is a national stage application of PCT/EP2007/000942, filed Feb. 5, 2007, which claims the benefit of priority to European Application No. 06425070.7, filed Feb. 10, 2006, the contents of which hereby incorporated by reference.

TECHNICAL FIELD OF THE INVENTION

The present invention relates to the field of supplementary services inside PLMNs beyond 2.5 generation, e.g. UMTS and GSM-GPRS, and more precisely to a method and architecture to deliver pre-customized business cards multimedia contents through IMS-based PLMNs for improving the existing calling line identification service. In the following, term "business card" also includes "visiting card" or whatever equivalent expression. Useful acronyms and bibliographic references are given at the end of the description.

BACKGROUND OF THE INVENTION

A large integration between IP and PLMN networks is under way to the benefit of wireless customers who may enjoy a lot of attractions offered by IP over traditional telecommunications protocols and in meanwhile experiencing "seamless" communications over the different types of networks which their calls may pass. This facilitates a wide diversity of communications scenarios and combination of services such as the exchange of real-time multimedia streams during voice calls. The core of the IP-PLMN integration is a 3GPP platform named IMS which has been introduced appositely to offer to the operators, the service providers, and the clients the sort of service capabilities that IP is designed to provide. The primary focus of the IMS platform is that to provide the users/clients with the ability to join multimedia session in which they are allowed to send and receive voice and data communications even when roaming. The IMS will use the emerging IP version 6 (IPv6) together with SIP protocol for the establishment of sessions and the service provisioning on mobile networks. SIP is an application-layer control (signaling) protocol for creating, modifying and terminating sessions with two or more participants. These sessions include Internet multimedia conferences, Internet telephone calls, presence service and multimedia distribution, etc. SIP supports user mobility by proxying and redirecting requests to the user's current location. For more details see [RFC3261] at the end. For the same purpose [TS_22.228] identifies the necessary requirements from the user point of view. The reference architecture for IMS subsystem can be found in [TS_23.002]. A more exhaustive description of the involved entities can be found in [TS_23.228].

SIP is based on an HTTP-like request/response transaction model; each SIP transaction consists of a request that invokes a particular method, or function, on the server and at least one response. A header is a component of a SIP message that conveys information about the message, it is structured as a sequence of header fields. Header fields are named attributes that provide additional information about a message. The details of the session, such as the type of media, codec, or sampling rate, are not described using SIP. Rather, the body of a SIP message contains a description of the session, encoded in some other protocol format. One such format is the Session Description Protocol (SDP) [RFC2327]. The SDP body is carried by the SIP message in a way that is analogous to a document attachment being carried by an email message, or a web page being carried in an HTTP message: for HTTP see [RFC2616]. A SIP request message named "MESSAGE" is introduced by the specification [RFC3428]) to carry in the request body the information needed to set up a specific service. MESSAGE is a very flexible SIP request message supported by every SIP platforms and SIP Application environments. In fact, it is a generic asynchronous SIP message that can be used inside or outside to the session. It is also possible to specialize its structure according with the service requirements. A header field "Subject" of the SIP MESSAGE Request provides a summary or indicates the nature of the SIP MESSAGE message, allowing call filtering without having to parse the session description. In the scope of supplementary service the [TS_24.081] document is a relevant prior art which specifies the procedures used at the radio interface for the following items: normal operation, registration, erasure, activation, deactivation, invocation and interrogation of line identification supplementary services. Particular relevance assume the Calling Line Identity (CLI) clauses 1 (CLIP) and 2 (CLIR). The CLI consists of a calling party BCD number and optionally, a calling party subaddress and/or a cause of no CLI. The purpose of the calling party BCD number information element is to identify the origin of a call; it is a type-4 information element. In the network to mobile station direction it has a minimum length of 3 octets and a maximum length of 14 octets. This information element is not used in the mobile station to network direction. The calling party subaddress is a type 4 information element with a minimum length of 2 octets and a maximum length of 23 octets, its purpose is to identify a subaddress (IMEI) associated with the origin of a call. When calling line identification restriction is applicable, the originating network provides the destination network with a notification that the calling party's ISDN number, with possible additional address information, is not allowed to be presented to the called party.

The Call Line Identity (CLI) is a service actually implemented to enable the end user to see who is calling his mobile device, is a feature which most mobile (and fixed) users take for granted. The existing CLI is a poor type of service indeed, all information that is possible to get is carried by only few bytes limitedly to the only downlink. This is in strident contrast with the great opportunities of service offered by the IMS platform and the expectations of the users.

SUMMARY OF THE INVENTION

In on embodiment of the invention, there is a method including sending, by the caller at the very initial instant of the call setup, to a CLI-dedicated application of the IMS, a SIP request known as MESSAGE including in the body both SIP URIs of the caller and the callee; including, by the CLI-dedicated application, in the body of said SIP MESSAGE either the multimedia content of a pre-customized personal card matching both SIP URIs, called hereafter business card, or some address links to retrieve previously stored components of the multimedia content; forwarding the SIP MESSAGE to the callee by the CLI-dedicated application; receiving the SIP MESSAGE on the phone of the callee and either getting said multimedia content from the body of the SIP MESSAGE directly or retrieving the components using the address links for rendering and playing the business card.

In one aspect of the invention, there is a CLI-dedicated network architecture making the method operative.

According to the invention, the Multimedia CLI application enriches the "Calling Line Identification" concept enabling the user to send own pre-customized business cards to other IMS (IP Multimedia Subsystem) users during the setup of an audio call.

This service empowers the standard CLI service by associating multimedia contents like pictures, textual information, sound files and small video clip to the setup of a phone call. Users therefore enjoy a multimedia experience during the ringing time of the phone call. Moreover users may afterwards browse the complete business card portfolio of their contacts in a multimedia wallet application installed in the phone.

The Multimedia CLI service is an IMS based service for UMTS and EDGE/DTM networks.

The Call Line Identification (CLI) service, which enables the end user to see who is calling his mobile device, is a feature which most mobile (and fixed) users take for granted. IMS enhance this very basic (yet very desirable) service by enabling users to create a variety of personalized 'business cards' which will be displayed on other users' mobile devices when they are called. These business cards contain a wide array of customizable components including pictures, texts, music, speech, links and/or animation.

Additionally, users can create a variety of different business cards and then define filter criteria to determine which one should be displayed. Filter criteria (which define the user's profile) include calling/called party white lists and the list of media components allowed by the user.

Target customers for the Multimedia CLI service would be both business users and mass market users. It would be appealing to business users as it is an additional marketing tool and allows them to enhance their networking portfolios via the use of virtual business cards (which are stored on the phones of called parties). Mass market users such as teens would appreciate the personalized nature of the service, giving them an added opportunity to express their individuality.

As regards revenue strategies, the Multimedia CLI application could potentially be a free-of-charge service (to increase customer loyalty and reduce churn) or follow a flat fee pricing model. Alternatively a business model could be created upon the need to buy a pre-tailored business card or to increase the number of allowed cards. IMS provides the basic infrastructure to enable the Multimedia CLI service including critical service filtering and triggering capability (determining which calling card should be displayed) as well as session setup capability.

The application would require minimal CAPEX for those operators who had deployed an IMS platform, with the Multimedia CLI application (running on a SIP-capable Application Server) and the requisite client SW plug-in (downloadable on the client) being the only added investment required to deploy the service.

Users, subscribed to the MM-CLI service, create a set of Business Cards with their personal details, contact addresses, pictures and optionally audio files or videos.

Users associate the Business cards to their personal contacts (buddies, buddy lists, groups).

Users specify in their profile settings the media contents they do not want to receive (e.g. no audio files). When a user phones to another the Business Card chosen by the caller (or the default one) is displayed as foreground in the callee's phone while the phone rings.

The called party can save the Business Card and display it again once the call has been ended.

The called party can return an his own Business Card to the caller. According an alternative embodiment of the invention suitable for voice over IP conference, PoC, etc, the messages for the control of MM-CLI services may be alternatively included in the body of the SIP INVITE.

BRIEF DESCRIPTION OF THE DRAWINGS

The present invention may be understood with reference to the following detailed description of the embodiments thereof taken in conjunction with the accompanying drawings, wherein:

FIG. 3 illustrates an exemplary interworking the MM-CLI service between enabled domains, similar to FIG. 1.

FIG. 4 illustrates an exemplary interworking the MM-CLI from an enabled to a not enabled service domain, similar to FIG. 1.

DETAILED DESCRIPTION OF AN EMBODIMENT OF THE INVENTION

Figure 1:
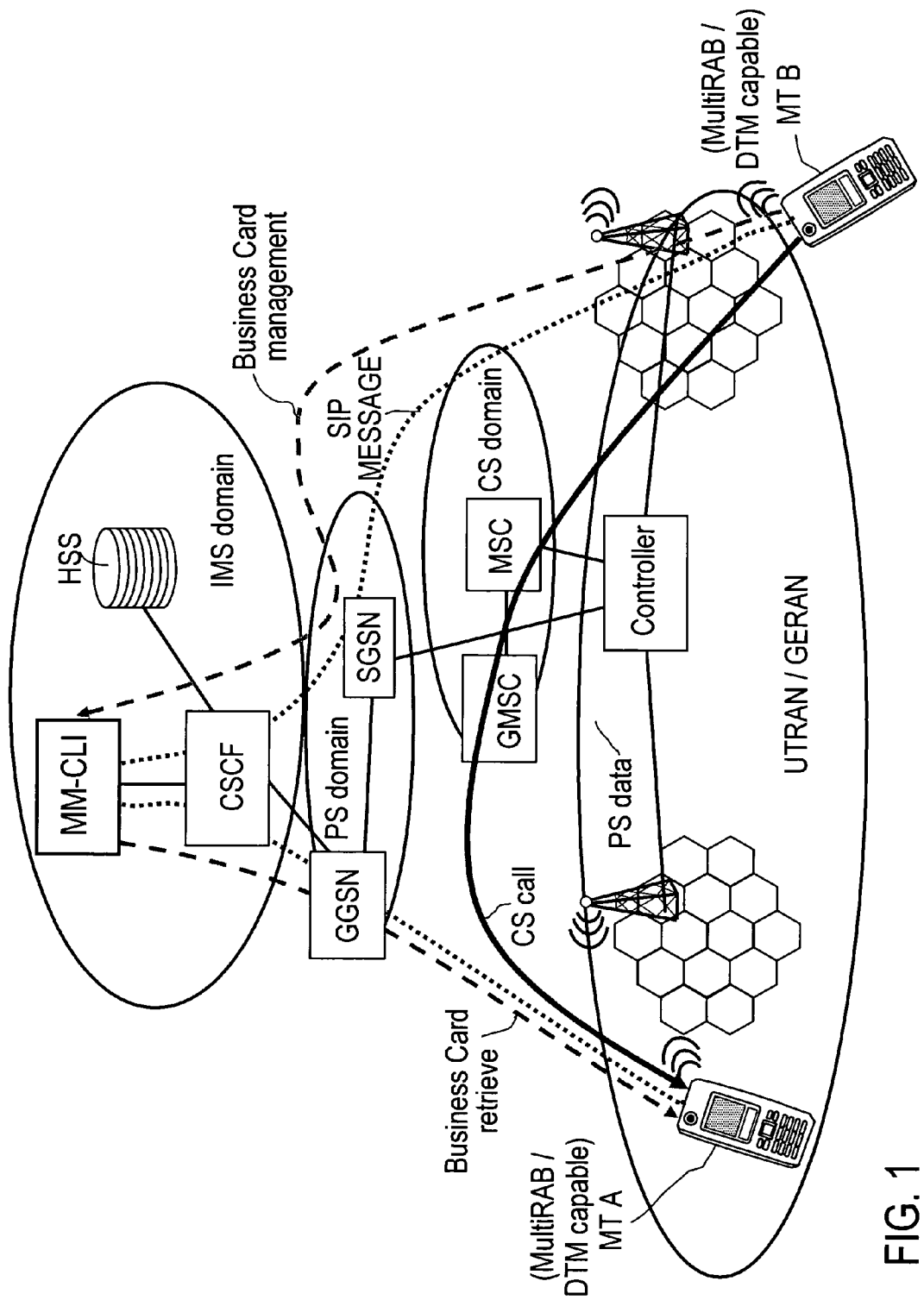
FIG. 1 shows an UMTS/GSM-GPRS server-based scenario for implementing the Multimedia Call Line Identification (MM-CLI) service inside a single service domain, according to the present invention.

FIG. 1 shows a simplified communication scenario including a mobile radio system (either UMTS or GSM-GPRS) with two Mobile Terminals MT A and MT B (either multi-RAB or DTM capable) connected to each other through the core network and a common IMS domain the MT A and MT B belong to. Without limitations, the architecture depicted in FIG. 1, with the exception of a block called MM-CLI, can be largely derivable from the 3GPP Technical Specifications (TS), also considering the consolidated IETF RFCs. The mobile radio system is subdivided in a Core Network (CN) connected to a Radio Access Network (RAN), either UTRAN or GERAN. The Core Network includes the CS domain, the PS domain based on GPRS, and the EMS connected to the PS domain. The Radio Access Network includes a plurality of serving cells each of them corresponding to the coverage area generated by a respective Base Station (BS). All the BSs of the RAN are connected to a common Controller RNC/BSC able to handle both CS calls and Packet Data transmissions in parallel. Inside the Core Network the CS domain includes an MSC and a gateway element GMSC; the MSC is connected both to the Controller and the GMSC. The PS domain includes a SGSN node and a gateway GGSN node; the SGSN node is connected both to the Controller and the GGSN node. The IMS domain includes the following elements: CSCF, HSS, and a MM-CLI Server. The CSCF block is connected to both HSS and MM-CLI inside the IMS, and to the GGSN outside node.

Impressed on the figure there are four curved lines. A solid line is associated to the CS path of a voice call, it departs from the mobile terminal MT B and arrives to MT A through the CS domain. A dotted line is associated to the SIP signaling path between the two terminals MT A and MT B, it crosses the PS domain and the MM-CLI server inside the IMS. A first dashed line is associated to the management messages of the Business Card, it departs from MT B and through the PS and IMS domains reaches the MM-CLI server. A second dashed line is associated to the management messages of the Business Card, it leaves the MM-CLI server and through the IMS and PS domains reaches the MT A terminal. In the following the acronyms MT, UE, MS are considered as synonyms. The IMS refers to the set of CN entities using the service provided by the PS domain to offer multimedia services. The CSCF element can act in the following three ways: Presence-CSCF (P-CSCF), Interrogating-CSCF (I-CSCF), Serving-CSCF (S-CSCF). The P-CSCF is the first point of contact for an end-user device when the IMS is contacted from inside the same administrative domain as the IMS. The P-CSCF: forwards SIP messages; translates IDs other than SIP URI into SIP URIs; maintains a security association between itself and each UE. The I-CSCF is the first contact point, when the IMS is contacted by an IMS of another administrative domain. The I-CSCF: forwards SIP messages; obtains from the HSS the address of the S-CSCF; conceals the internal network configuration, capacity, and topology. The serving S-CSCF performs session control and service triggering. The S-CSCF: acts as registrar (a server that accepts register requests forwards SIP messages; interacts with the Application Server (AS) such as the MM-CLI; authenticates according to HSS/UMTS data. The HSS is a database which contains IMS subscriber-related information. This database includes data for: Identification; authorized services; subscribed services. The IMS platform of FIG. 1 provides the following capabilities:

Access control: the IMS must be able to verify at any time if the user is allowed to use the resources of IMS.

Capability negotiation: the IP multimedia applications must have the possibility to identify and select the available media components and the QoS of the sessions. The IM subsystem must allow such negotiations to be started from any party (user, operator, or the application itself on behalf of them) and at any time (at the session invocation, during the acceptance or during the session).

Redirecting of multimedia session: the IM subsystem must allow the identification of an alternative destination for an IP multimedia session or individual media of an individual session. Similarly to the capability negotiations, the IM subsystem must allow such redirection to be started from any party (the receiving party, the sending party or the network entities on behalf of them), at any time (prior the set up of the session, during the initial request, during the establishment or during the ongoing session).

Invoking an IP multimedia session: the user must be able to invoke one or more IP multimedia sessions and to activate concurrent applications inside each multimedia session. To this purpose the identification of the entities will be allowed through the use of both Phone and Internet numbering, depending on the ability of the originating party.

Handling an incoming session: the terminating entity must be able to identify the session originator, to negotiate the capabilities interacting with the user profile and to decide if accept or reject the session. In particular it must be possible to accept only a subset of the offered media.

Handling of an ongoing session: the user, as said before, must be able to decide about the addition or the deletion of media components of IP multimedia applications during a session. Moreover it must be possible for the user to suspend and resume at a later time a multimedia session.

Ending a session: the user must be able to end an ongoing session at any time.

Local Services: the users must be able to access, while roaming outside the home environment, services of local nature offered by the visited network.

Figure 2:
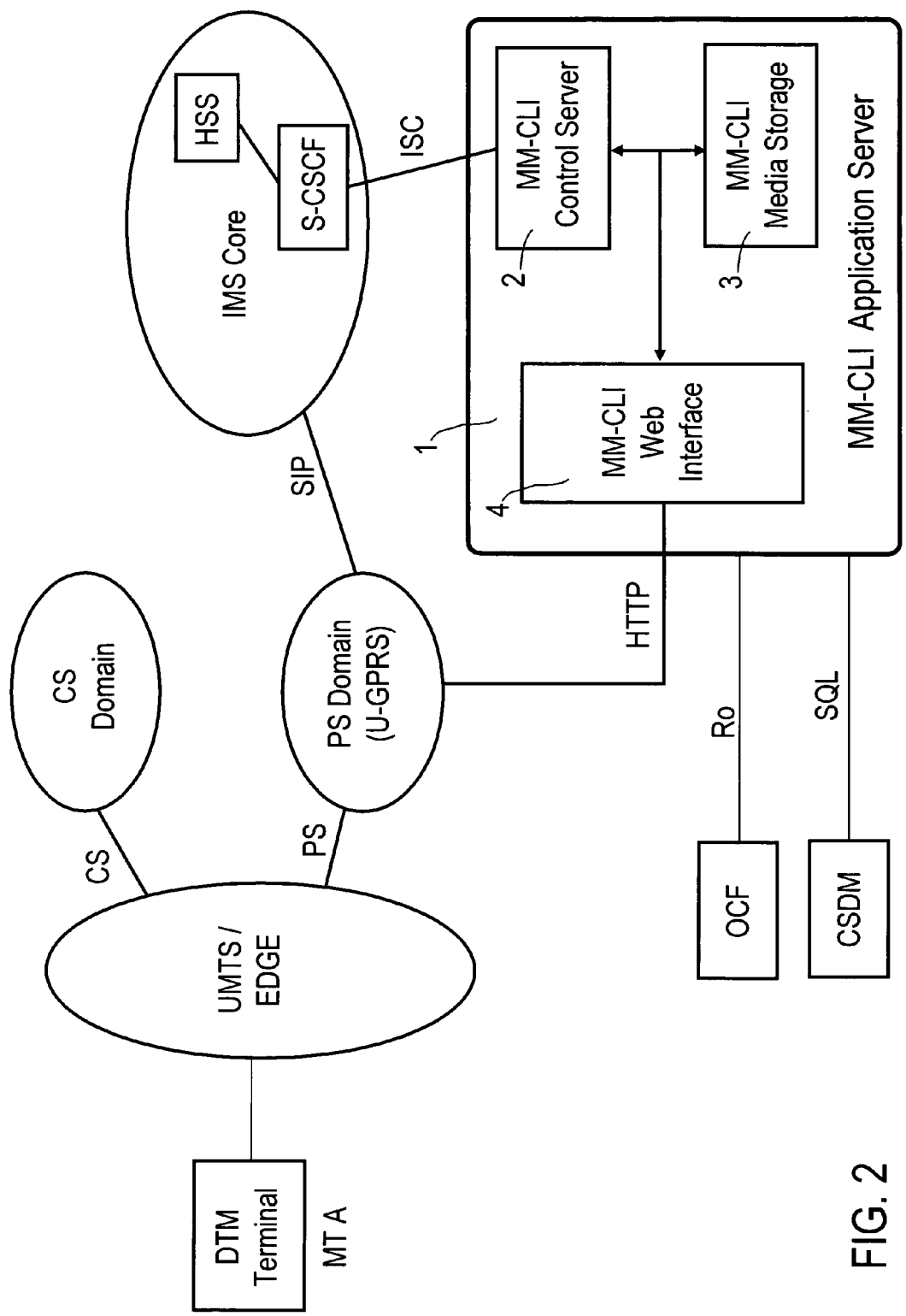
FIG. 2 shows the very general network architecture of the scenario of FIG. 1.

With reference to FIG. 2, we see the following three functional blocks inside the MM-CLI server 1 interconnected to each other: MM-CLI Control Server 2, MM-CLI Media Storage 3, and MM-CLI Web interface 4. The MM-CLI Control Server 2 is connected to S-CSCF through the ISC interface. The MM-CLI Web interface 4 is connected to the PS-domain through an HTTP link. The MM-CLI server 1 is further connected to a CSDM block through an SQL link and to an OCF block through the Ro interface. In operation:

the MM-CLI control server 2 handles the SIP signalizing flow. It also takes care over the policy rules (client profiles), message filtering and content inserting will be provided by this instance. An implementation would use the Ubiquity SIP application server as underlying service. Since no session orientated exchange of media data is performed in this service, the usage of a SIP session is prevented. Instead, the SIP element "MESSAGE" is used to transport MM-CLI control messages and MM-CLI multimedia content. Therefore the message mode can be described as "page mode" based. Semantic and syntax of the MM-CLI SIP MESSAGE will be given later on.

The MM-CLI media storage 3 server stores all the multimedia content of a business card, e.g. pictures, videos, or audio files.

The MM-CLI web interface 4 has two main purposes: a) allows the end user to control the stored business cards and perform policy control; b) the 5 download of the multimedia components of the business cards. Free Apache server could be used as main web portal.

The web portal server (not shown) hosts both the web pages used to access to the service functions (business card creation/deletion/modification, business card assignment, user profile management, etc.), and the contents o uploaded by the users to create their own business cards (even http links).

Figure 14:
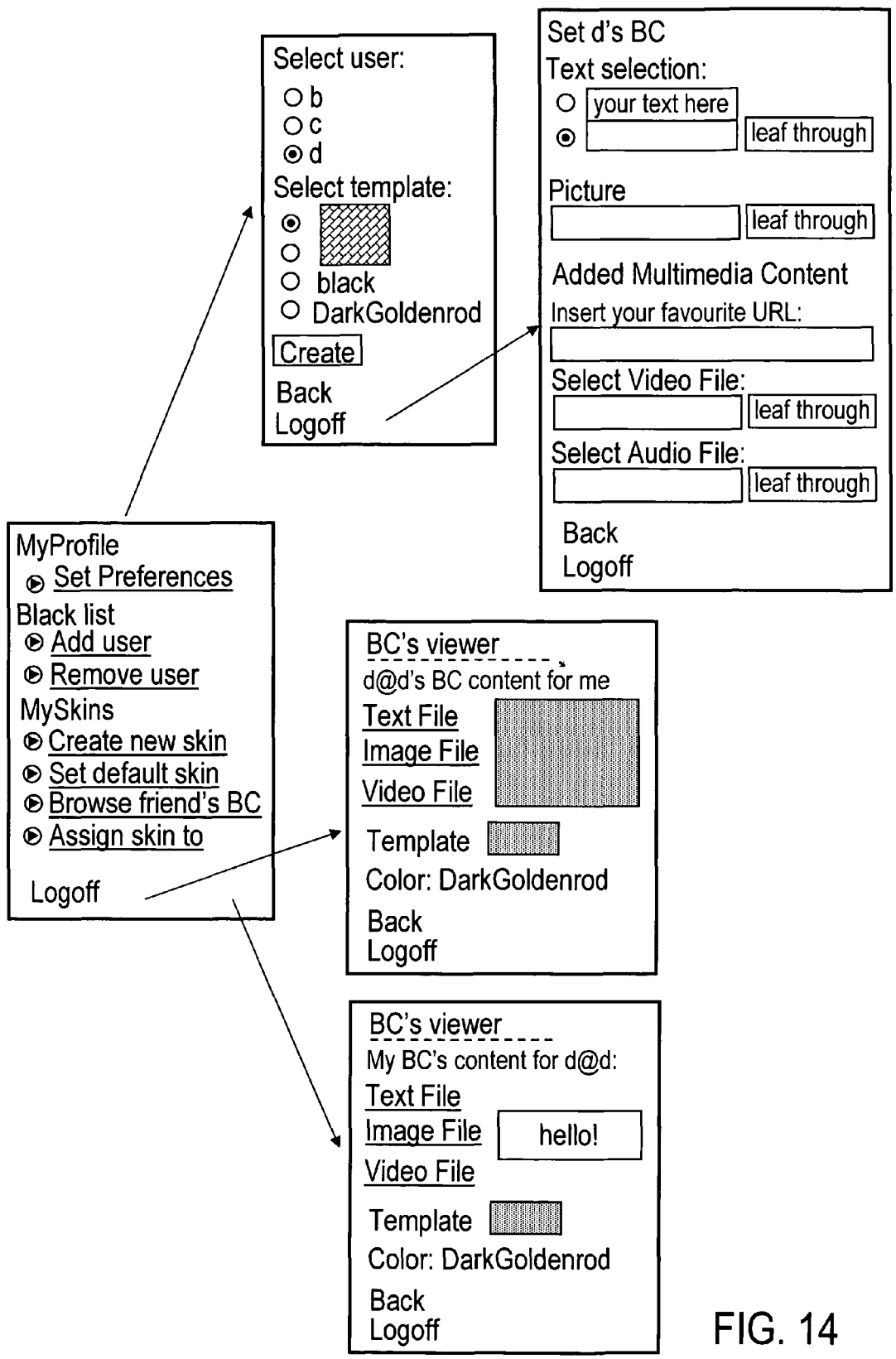
FIG. 14 shows some sample pages MM-CLI retrievable by a web portal.

The web portal is accessed from the client application with a specific entry of the options menu. After the user has inserted once his credentials he's authenticated for any subsequent access to the portal with a cookie mechanism. If the business cards are allowed to contain large video contents 5 the Web server will host the contents and have them available to the streaming platform via NFS mounting of a specific folder. Some sample pages retrievable by the web portal are shown if FIG. 14.

The delivering of the BC service inside the scenario of FIG. 1 and the equivalent architecture of FIG. 2 will be detailed with reference to the relevant message o sequence charts of the FIGS. 8 to 11 successively introduced.

FIGS. 3 and 4 are a generalization of FIG. 1 when the users belong to different IMS domains (and also to different networks). Domain interworking is an important point for the MM-CLI service. For domain interworking two different scenarios can be shown: 5 1. Domain A and B are MM-CLI service enabled (this option is preferred).

2. Domain A is MM-CLI service enabled and Domain B not (or vice versa).

Figure 12:
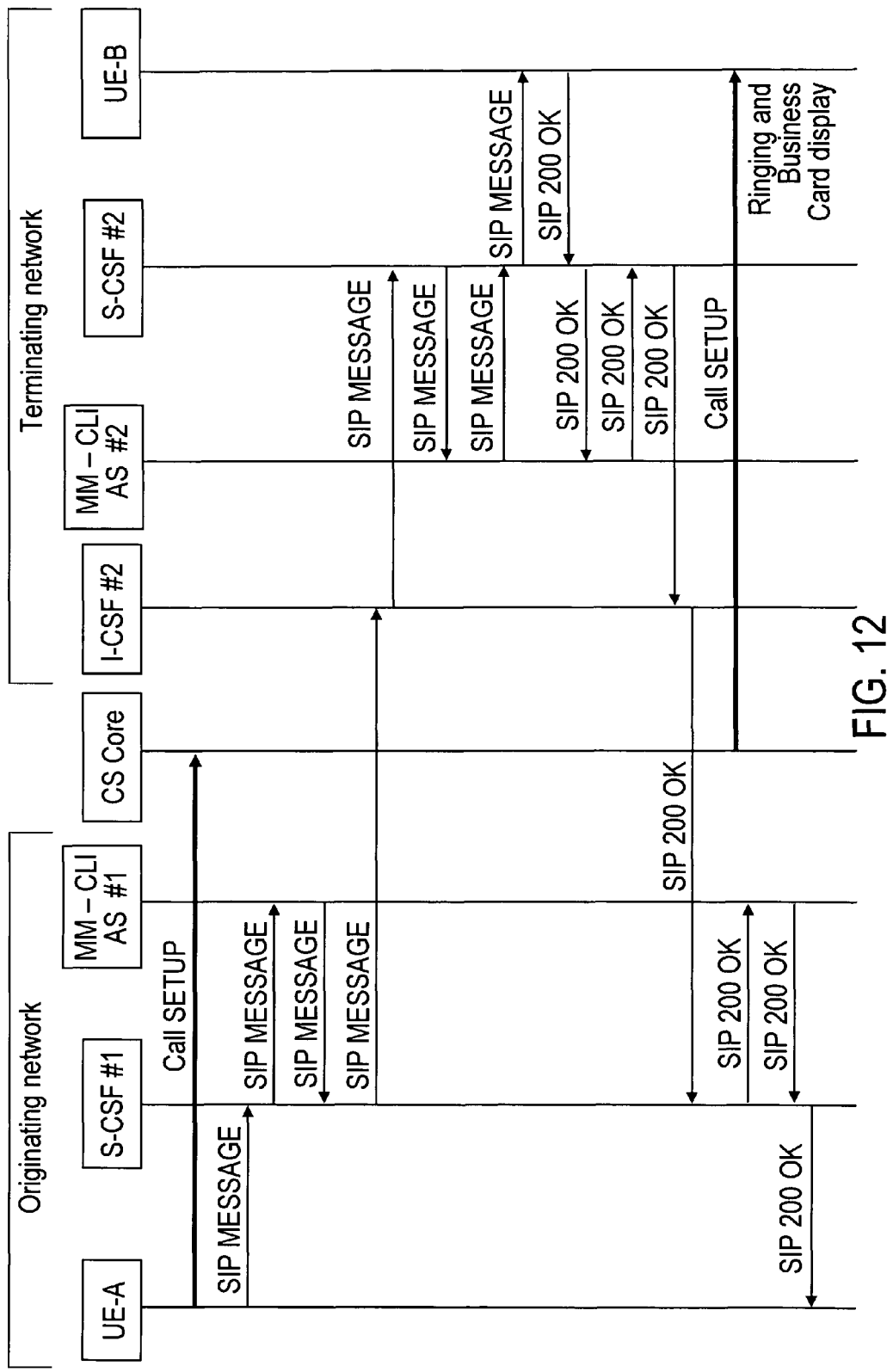
FIGS. 12 and 13 show two message sequence charts for interworking the MM-CLI service according to the architectures of FIG. 3 and FIG. 4, respectively.

The first interworking scenario is visible in FIG. 3, where the overall network includes two interconnected networks indicated as Domain A and Domain B, the first one accessed by MT A and the second one by MT B. Each domain includes all the elements 0 depicted in FIG. 1. The two handsets MT A and MT B can perform a voice call on an audio path through the two CS Core and exchange SIP messages on a relevant signaling link between the two MM-CLI servers. When both domains are MM-CLI enabled, the interworking is well defined via the IMS interworking concept. Each SIP message from MT A in domain A will be routed trough several proxies to the UE in domain B. In such a scenario with two MM-CLI servers a special policy control is required. UE A is the source of the BC in domain A and UE B is the receiver of the BC in domain B. When UE A is sending a BC, the BC will be send to the MM-CLI in domain B depending on policy in MM-CLI server in domain A. The MM-CLI server in domain B will be also using a policy control and could reject the BC. The signalizing flow for this type of interworking is shown in FIG. 12.

Figure 5:
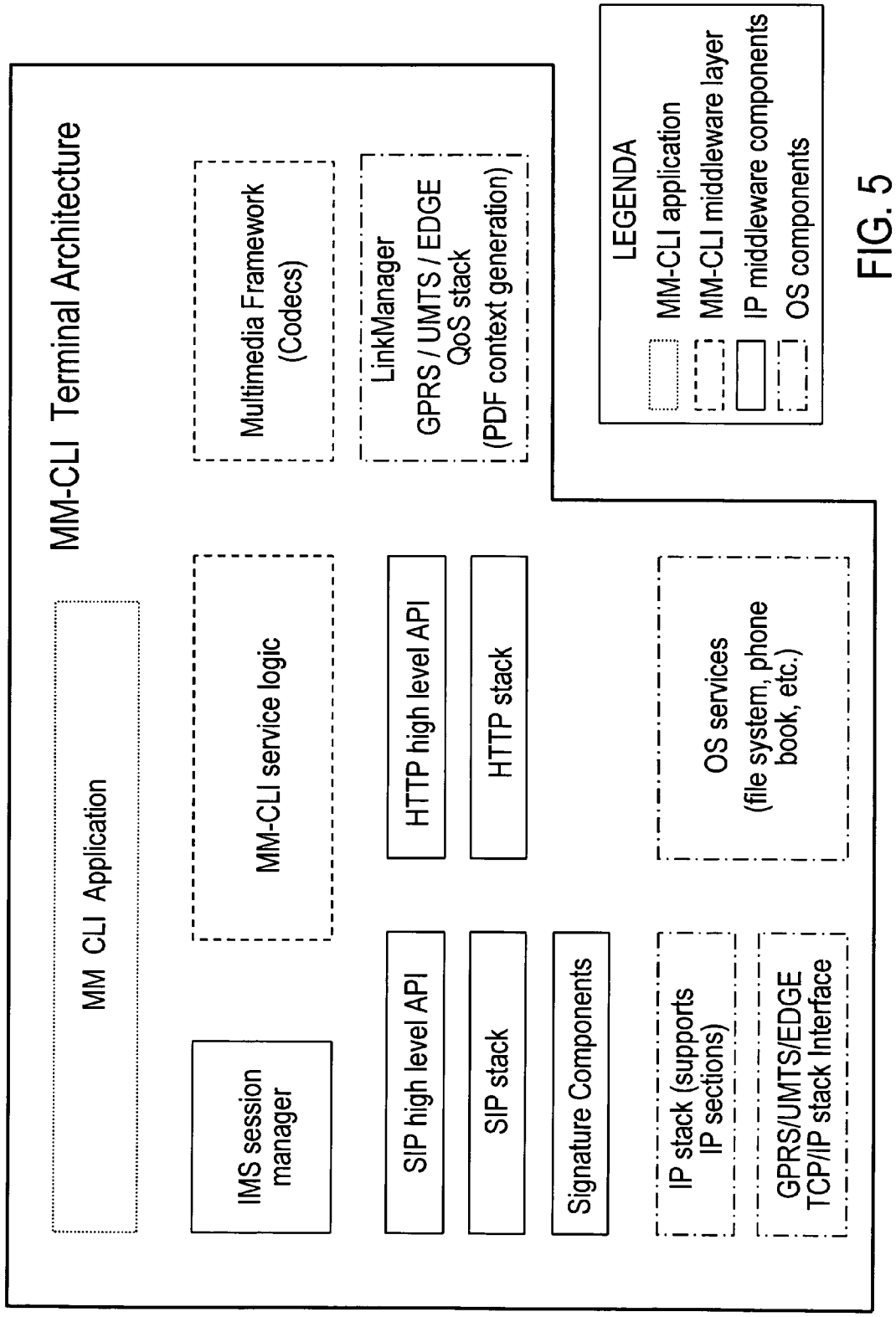
FIG. 5 shows the MM-CLI the functional architecture of the User Terminal.
Figure 13:
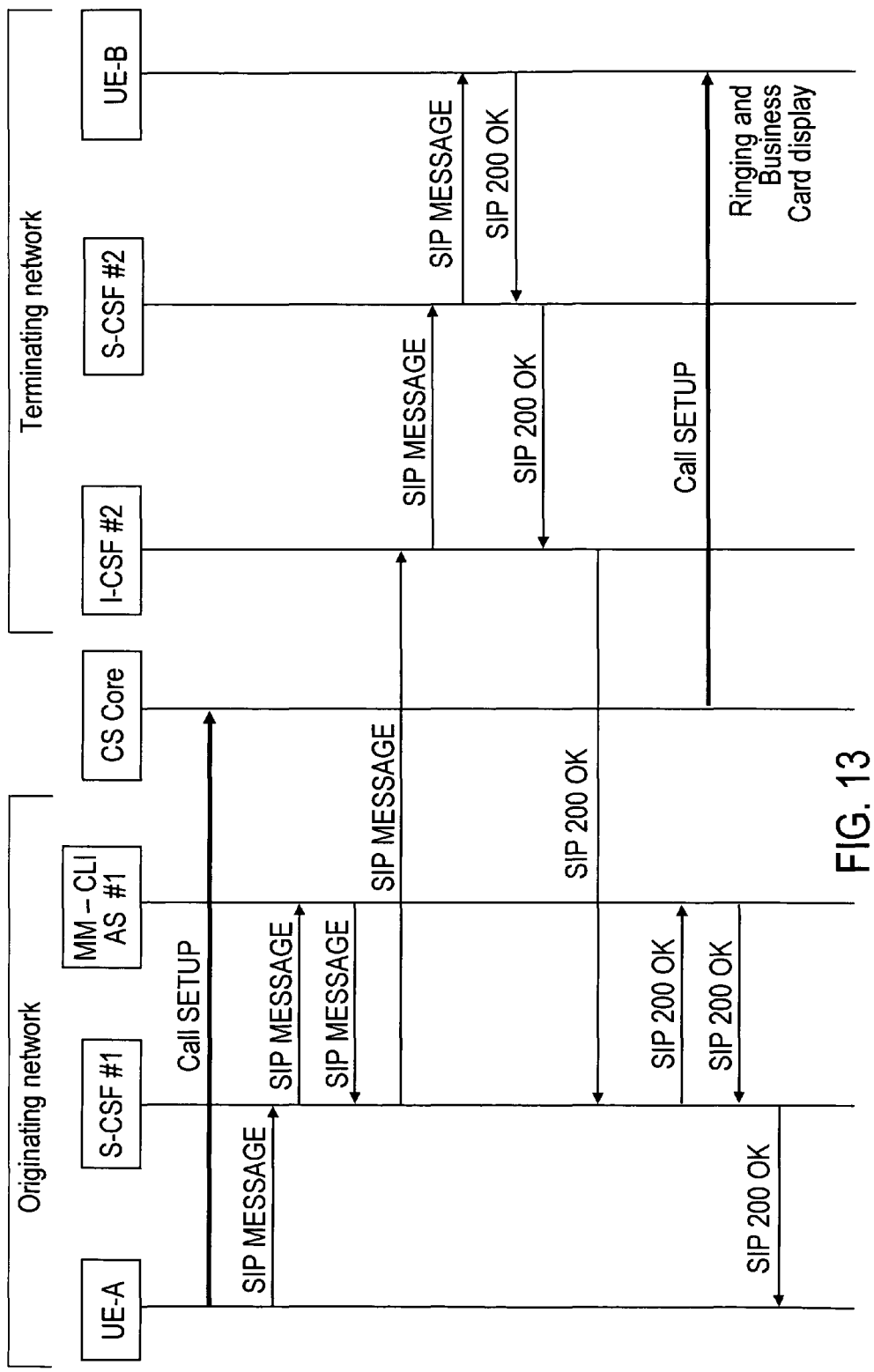

The second interworking scenario of FIG. 4 differs from the one of FIG. 3 only by the absence of the MM-CLI server inside Domain B. In this case the MM-CLI server inside Domain A exchanges SIP messages with the IMS core of Domain B directly. The signalizing flow for this type of interworking is shown in FIG. 13. It is clear that the receiving MT B in domain B has no possibility to apply policy rules because of the missing MM-CLI application server. The MM-CLI server in domain A will send a default business card for such cases. The architecture of the MM-CLI terminal MT A, MT B is represented in FIG. 5. It consists of many components indicated with various types of lines in the included LEGENDA. The OS components provide services like an IP stack, TCP/IP stack, a multimedia framework or a link manager.

Figure 6:
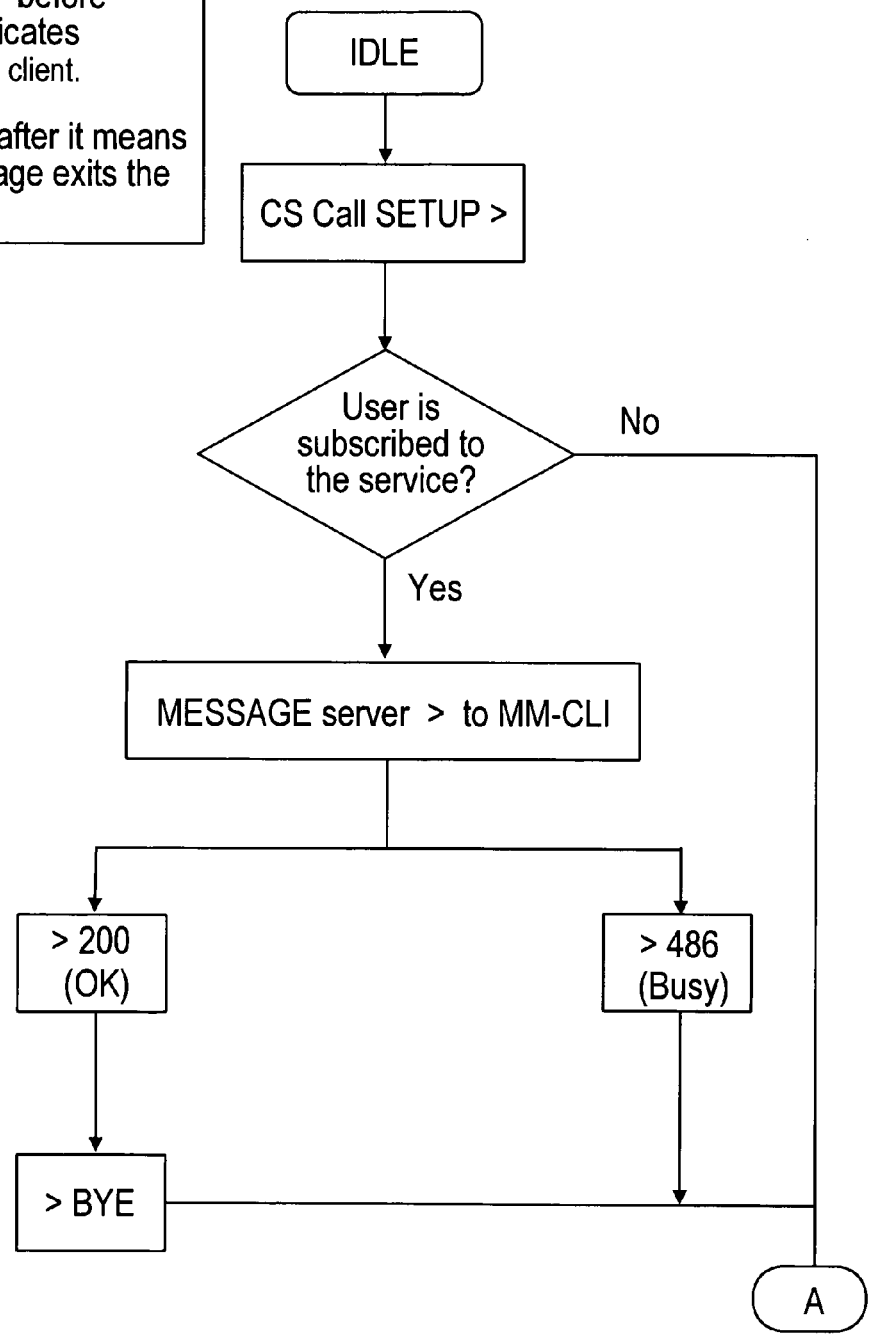
FIG. 6 shows the flow chart of a MM-CLI caller client module inside the User Terminal of FIG. 5.
Figure 7:
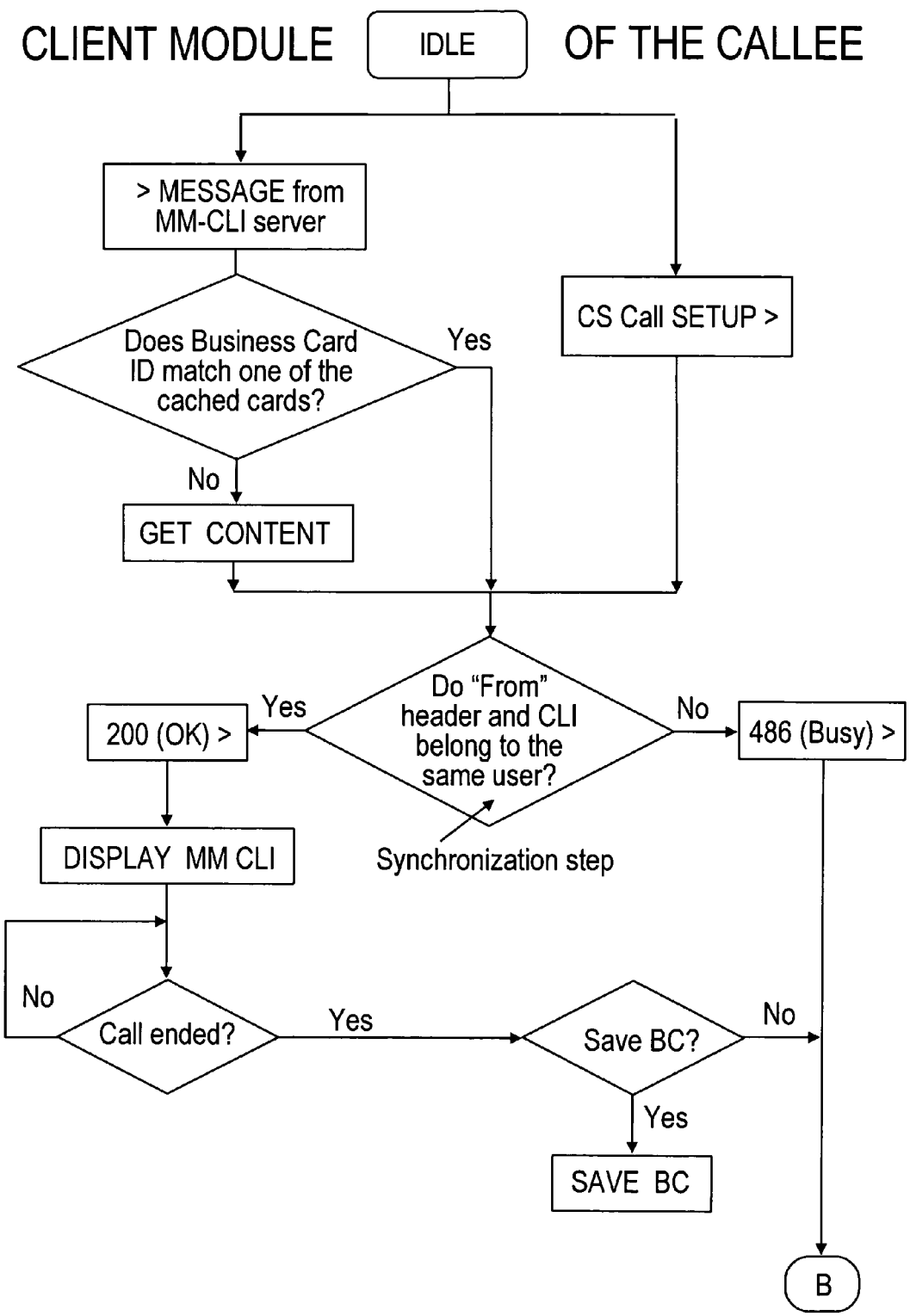
FIG. 7 shows a flow chart of a MM-CLI callee Client module inside the User Terminal of FIG. 5.
Figure 8:
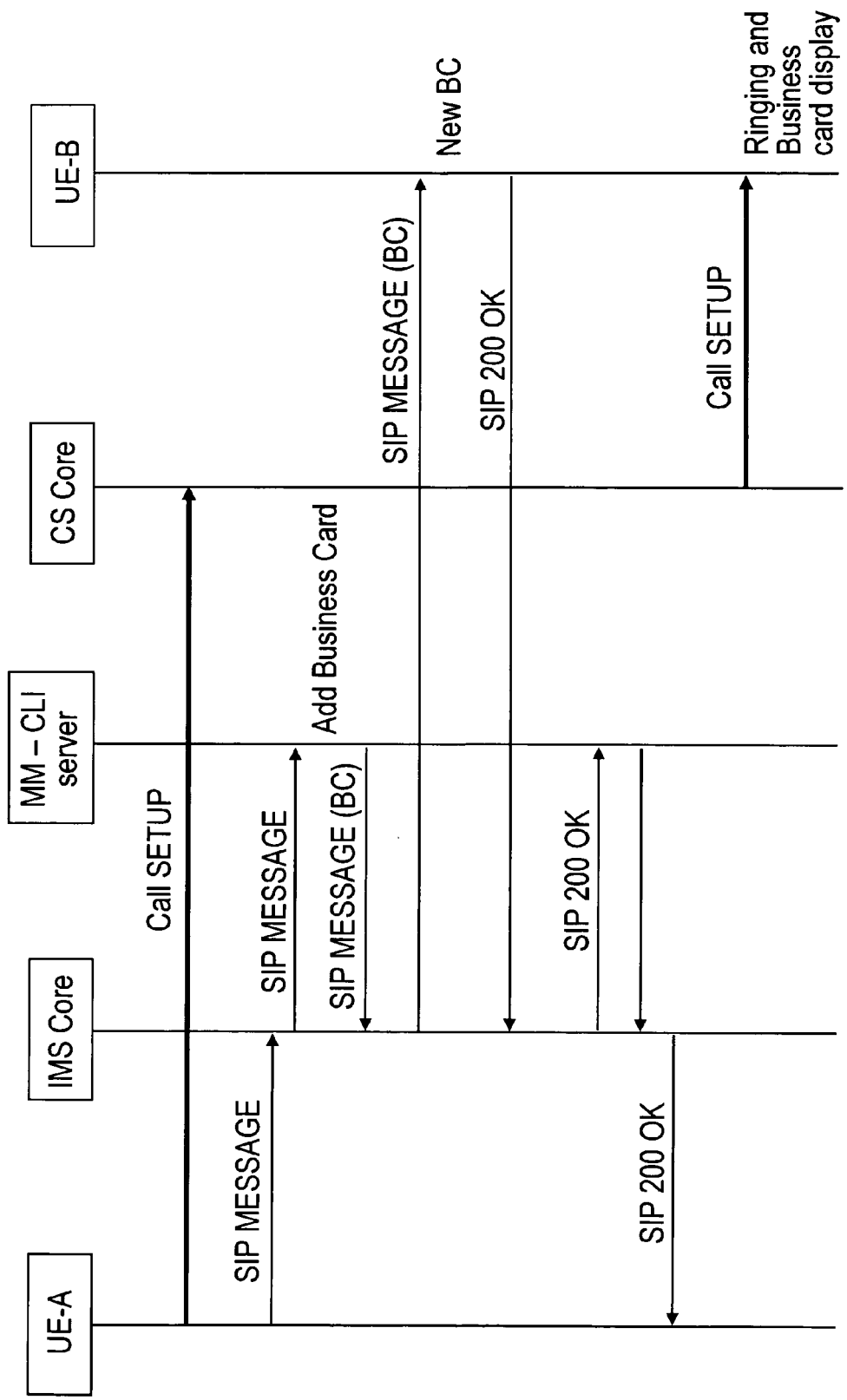
FIGS. 8 to 11 show different message sequence charts for an equal number of use cases of the MM-CLI service provided inside the same service domain.

The operation of the MM-CLI service logic is represented in FIG. 6 for the caller client module and in FIG. 7 for the callee. The caller client, as shown in FIG. 6, is responsible for monitoring the line status: when the user calls a number it creates a MM-CLI MESSAGE and sends it to the server. On the other hand, if there is an incoming call, the callee client matches the incoming CLI against the eventual MM-CLI MESSAGE arrived from the server. Upon matching the Business Card is retrieved from the cache (if previously stored on the handset) or downloaded from the portal using the information contained in the MM-CLI SIP MESSAGE. The MM-CLI SIP MESSAGE body contains the following parameters:
server (owner): the domain name/IP Address of the server that hosts the MM-CLI contents
inviter: the SIP/tel URI of the caller. This parameter is used by the callee client to match the CLI information received from the CS core.
port: a TCP port number where the server listens for incoming HTTP requests
skinID: an unique identifier generated by the server when the business card is created. It is used by the client to identify a cached business card and to decide whether the card contents must be updated or not
.
protocol: default value is HTTP. This parameter indicates the protocol that the client must use to retrieve the business card contents
image: a relative path under which a JPEG image attached to the business card may be found in server.
text: a relative path under which a TXT file attached to the business card may be found in server.
ftext: a string directly edited by the user in the portal during the business card creation. It is displayed in the business card
video: a string (syntax path SP description) with a relative path under which a 3 gp videoclip, attached to the business card may be found in the streaming server (identified by rlink) and a description of the file.
rlink: an RTSP URL (rtsp: //server domain/path) indicating the streaming server that hosts the content specified in video, rlink/path is an RTSP URL directly playable by the handset.
audio: a string (syntax path SP description) with a relative path under which an audio file attached to the business card may be found in server and a description of the content.
flink: a string (syntax URL SP description) with an HTTP URL of a website (personal page, favourite bookmark, blog) and its description.
template: an identifier specifying preconfigured Business Card templates. Sample templates are "picture in the top right corner,
text in center left" and "picture as background and text in the center".
color: a color tag composed by six hexadecimal values (000000=black, FF0OOO=red, FFFFFF=white).

It is recognized as mandatory to define an XML body format to describe the MM-CLI Business Card components The depicted architecture provides the user terminal with the following capabilities: Multi tasking; In-call, application switching; Rendering Engine for business card; MM-CLI extended address book; Storage capacity; File system; IMS session manager (in devices with IMS session manager a SIP stack and high level API should be useable); Simultaneous CS/PS transfer (DTM), (the terminal SHOULD be class A devices or SHOULD support DTM according 3GPP TS 43.055). The transmitted MM-CLI business card has to be displayed. The needed description is commonly named as "scene description". Several formats are thinkable. As very basic format a MIME type based format could be used. For basic MM-CLI purposes a multipart message with a text message and a picture and a ring tone will be proposed. The picture can also be linked to the MM-CLI media storage server. The MT A on the left top corner of FIG. 4 shows an example layout for such an approach. The Text with a predefined maximum length will be always displayed with a predefined font and the image will be scaled to fit the display dimensions. Following an example for a multipart message with a text and an image is given:

```
Content-Type: multipart/mixed;
boundary="------------020605080305050205010003"
This is a multi-part message in MIME format.
--------------020605080305050205010003
Content-Type: text/plain; charset=ISO-8859-1; format=flowed
Content-Transfer-Encoding: 7bit
```

```
This is a test!
--------------020605080305050205010003
Content-Type: image/jpeg;
name="Example"
Content-Transfer-Encoding: base64
Content-Disposition: inline;
filename="image.jpg"
/9j/4AAQSkZJRgABAQAAAQABAAD/2wBDAAgGBgcGBQgHBwcJCQgKDBQNDAsLDBkSEw
8UHRof
8ttyGXSkJHMEtWzVPEfqtvbaclt/wDbnngvxWSufcRhB^ddVaNISemzf8AaOHKqT
rcmIPb
y/O6xmziPLKiakVSzzUpHCDyBYML+7G8+XM8CzUIVBHEQIUWtrúiAQAkJtcnvOJISHil
SIxWQ
rkcUryiNEF978PD3crduFfVOSIec5HDltHMCatpXeNbAJwkLewF29rs7ueCPR/oGP
Ia2ooH
HJKTd5WFvIDsGLaxmOEtJDMbugJ78Ba/TENQxeMAE4Dy6brISDFLKvCbjhY7HESTJc
wYvxOz
F7cZZQeK3K/fbG0eQV8iLG0jiMHiCjYA3vew8d8EabSbMwaYknvY4PUuSUIOgUre2C
KRpGLI
oA8MbYzGYzGHIjg/PG8fLHTGYzGY/9k=
--------------020605080305050205010003-
```

Target service should be as flexible as possible in providing personalization features to the appearance of MM-CLI business cards (colors, fonts, templates, position of image, etc.).

For this specific purpose we will define an XML based description to add the multipart/mixed body. Content-Type shall be application/mmcli+xml. The proposed Document Type Definition (DTD) is:

```
<?xml version="1.0" encoding="UTF-8"?>
<!ELEMENT BC (owner, components, template) >
<! ELEMENT owner (# PCDATA )>
<! ELEMENT components (media*) >
<! ELEMENT media (#PCDATA)>
<!ATTLIST media type (image | text | sound | video | web) "text">
<! ELEMENT template (bg, fg, font) >
<!ATTLIST template template-id CDATA #REQUIRED>
<! ELEMENT bg (# PCDATA )>
<! ELEMENT fg (# PCDATA )>
<! ELEMENT font (# PCDATA )>
```

Here follows an example of multipart/mixed body containing the XML description of the business card:

```
Content-Type: multipart/mixed;
boundary^"-----------020605080305050205010003"
This is a multi-part message in MIME format.
--------------020605080305050205010003
Content-Type: application/mmcli+xml; charset=UTF-8
<?xml version="I.0" encoding="UTF-8"?>
<! DOCTYPE BC SYSTEM "bc.dtd">
<BC>
<owner>sip :user@mydomain. com</owner>
<components>
<media type="text"/>
<media type="image">myself . jpg</media>
<media type=" sound" >http : //web .mydomain . com/mypath/myringtone .mid</media>
<media type= "video">rtsp : //vs .mydomain. com/mypath/myvideo .3gp</media>
</components>
<template template-id="2">
<bg>#FF0000</bg>
<fg>#OOOOOO</fg>
<font>arial</font>
</template>
</BC>
--------------020605080305050205010003
Content-Type: text/plain; charset=ISO-8859-I; format=flowed
Content-Transfer-Encoding: 7bit
Hi this is me!
--------------020605080305050205010003
Content-Type: image/jpeg;
name="Example"
Content-Transfer-Encoding : base64
Content-Disposition: inline;
filename= "myself . jpg"
/9j /4AAQSkZJRgABAQAAAQABAAD/2wBDAAgGBgcGBQgHBwcJCQgKDBQNDAsLDBkSEw
8UHRof
```

-continued

```
8ttyGXSkJHMEtVTzVPEfqtvbSclt/wDbnngvxiOufcRhBlVddVaNISemzf8AaOHKqT
rcmIPb
y/OδxmziPLKiakVSzzUpHCDyBYML+VGS+XMSCzUIVBHEQIUWmhAQAkJtcnvOJISHil
SlxWQ
rkcUryiNEF978PD3crduFfVOSIec5HDItHMCatpXeNbAJwkLewF29rs7ueCPR/oGP
Ia20oH
HJKTd5WFvIDsGLaxmOEtJDMbugJ78Ba/TENQxeMAE4Dy6brISDFLKvCbjhY7HESTJc
wYvxOz
F7cZZQeK3K/fbG0eQV8iLG0jiMHiCjYA3vew8d8EabSbMwaYknvY4PUuSUIOgUre2C
KRpGLI
oA8MbYzGYzGHIjg/PG8fLHTGYzGY/9k=
--------------02060508030505020501003-
```

Other Usable Protocols:

The well known HTML or WAP format is used to show static content, usually a mix of formatted text and images. The MM-CLI message could use this format to show the business card. If all content is included in a MM-CLI message, then a multipart MIME type message must be used. It is also possible to include links to the MM-CLI media storage server.

The SMIL format is used by MMS and will supported by a widely range of terminals. SMIL supports several media types such as formatted text, images (Gif and Jpeg) or 3GPP video (H.263, MPEG-4). Also a timing model is defined in SMIL.

BIFS is defined by ISO/IEC and part of the MPEG-4 systems suite. It allows a scene description with multimedia content and additional 2D- and 3D-object descriptions.

Also a timing model is defined. BIFS is used by the DMB broadcasting system and will be supported by DMB enabled handsets. DMB is an upcoming standard and is available in Korea and could be available in Europe from 2006 on.

The system description is now completed with the illustration of the relevant flow-charts for a set of important use cases for the MM-CLI service and their technical realization including call flows. The MM-CLI client is connected to the PS network via the GGSN. The signalizing path is controlled by the IMS (CSCF). The MM-CLI application server includes the MM-CLI service logic and the web portal. The service logic part of the server is connected to the CSDM for contact list and group management or policies purposes. The web portal is used to manage the MM-CLI business cards from the UE or the Internet. It also allows the download of multimedia content via specialized links from the UE. In most cases the calling UE A sends only a reference of the preferred business card that is stored on the MM-CLI application server. This is done by the definition of the following content in the SIP MESSAGE:

Empty body: The default MM-CLI business card for UE B depending on policy control will be used.

Reference: UE A sends a reference to a stored business card. • Content: UE A sends a business card message with all multimedia contend included. In that case, it's possible to store the business card on the MM-CLI application server. It is also the way in not MM-CLI enabled domains.

The IMS CSCF will relay the message from UE A to the MM-CLI application server. The server will send the business card depending on policy to UE B. The multimedia content will be included in the SIP message. With reference to the signalizing flow of FIG. 8, the business card is sent to UE independently from earlier receiving of the same business card.

Figure 9:
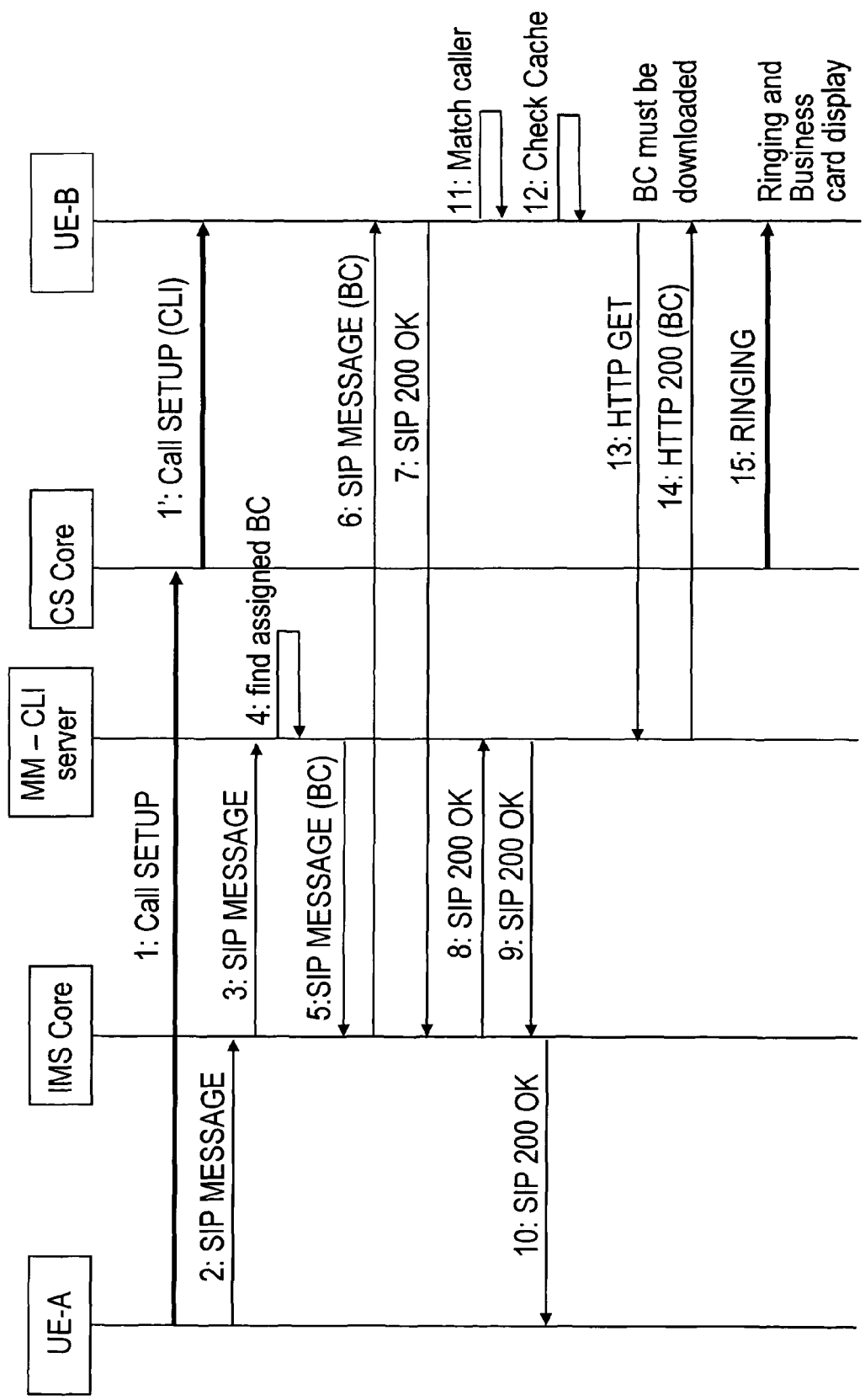

There are many reasons for sending in FIG. 9 the only references to the multimedia content to UE B. In this case only links to the stored multimedia content on the MM-CLI application server are sent to UE B via SIP MESSAGE. Some reasons are the following:

Caching: Once received BCs can be prevent from several transmitting. This will also speed up the displaying of the BC on UE B's terminal.

The message will be short. Large message with all the content included must pass trough several proxies (e.g. S-CSCF, P-CSCF, . . . ). This will delay the service.

With reference to the signalizing flow of FIG. 9:

1. The user LE-A initiates the call either dialing the number or retrieving it from his contacts/log of called numbers. 1'. The CS Core immediately sends CLI information to the callee (this service is default in the cellular networks). 5 2. The application creates a SIP MESSAGE containing data specific information and sends it to the MM-CLI server 3. The CSCF routes the message to the dedicated application server 4. The MM-CLI server matches the caller and the called users' SIP URI and find the suited business card (either a specific business card or a default one). Then the o profile of the called user is matched with the components of the card to remove unwanted media.

5. If the caller has not been blacklisted the server creates a message for the called peer containing all the information to retrieve the business card components from the server itself or from the cache. 5 6. The CSCF routes the MESSAGE to the called party 7. The SIP stack acknowledges the server with a SIP 200 OK 8. The CSCF routes the 200 to the AS (it acts as a B2BUA)

9. The AS returns a 200 for the calling user

10. The CSCF routes it upstream 0 11. The client application matches the calling number (CLI) with the data contained in the MESSAGE.

12. The cache is checked in order to retrieve, eventually, the card if it was previously downloaded.

13. If the card has been changed recently or removed from the cache the client 5 downloads the components of the Business Card from the MM-CLI server on a HTTP link and renders them.

14. The MM-CLI server acknowledges the MM-CLI server with a HTTP 200 OK.

15. The handset is ringing and the Business Card displayed until UE-B is not answering. 0 When using links to the MM-CLI application server for the multimedia content, a security concept must be established. From this point of view particular care shall be taken when domain interworking with the option of FIG. 9 is requested.

Figure 10:
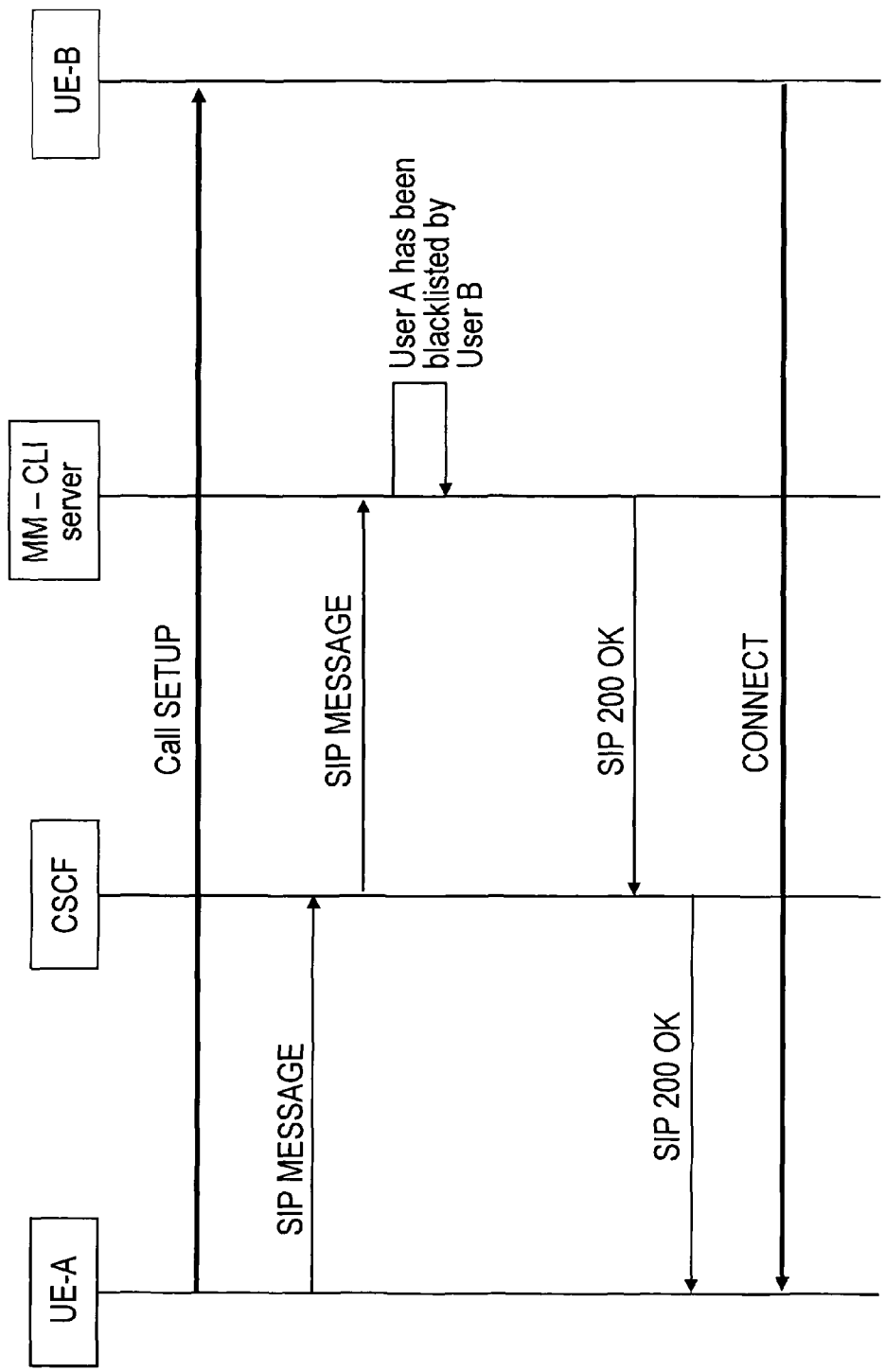

With reference to the signalizing flow of FIG. 10, the Reject business card opportunity is considered. If UE B has blacklisted UE A, the business card from UE A will 5 be redirected without notice to UE A or UE B.

Figure 11:
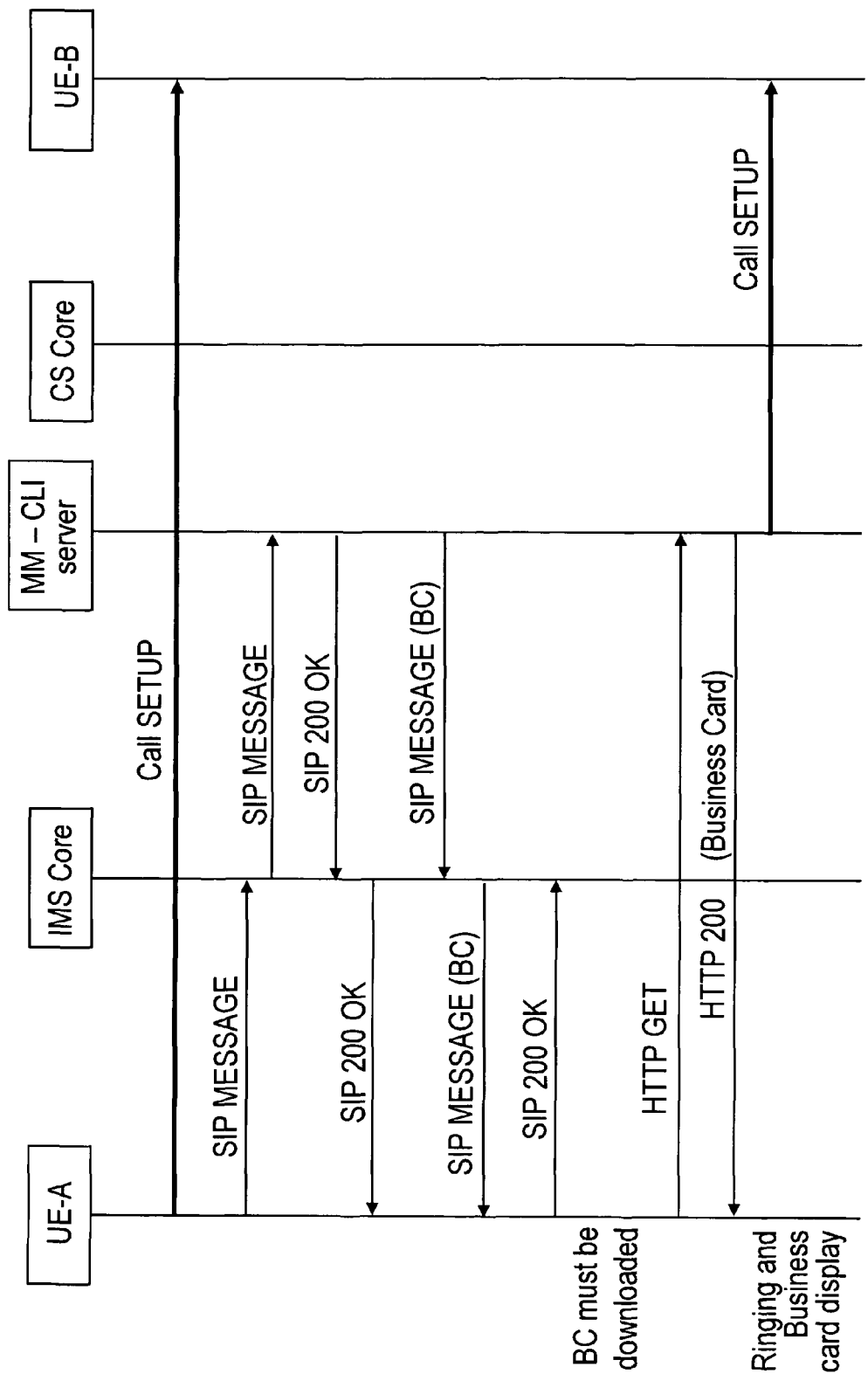

With reference to the signalizing flow of FIG. 11, the opportunity to return a Business Card to the caller is considered. It is also possible that the calling party receive its own BC or the BC from UE B. The signalizing flow depicted in the figure provides the simplest solution for returning a business card to the caller. The possibility to return the business card in the SIP 200 OK response to the first SIP MESSAGE sent by UE-A is under evaluation.

The signalizing flow of FIG. 12, is relevant to the interworking between the two MM-CLI enabled Domains A and B of FIG. 3; while the signalizing flow of FIG. 13 concerns the interworking between the enabled Domain A and not enabled Domain B of FIG. 4. Errors are possible with the MM-CLI service delivering, for example:

- B party has no IMS account and therefore not registered (→404 not found).
- B party has a IMS account but is not registered at IMS (→404 not found).
- B party is registered at IMS but has no MM-CLI client running (→timeout).
- B party is registered at IMS and has no MM-CLI client running but a default client SIP application is running and is answering to the message (→depending on default running client).

Charging

For charging, different models can apply each inducing different technical requirements to the architecture: 1. Bearer charging: The amount of data exchanged via the PS domain is measured and used as charging base. No service specific charging. This type of charging is done by the PS-infrastructure.

2. Session-based charging: The duration of the IMS session is measured and used as charging base. This type of charging can be done by the IMS core. 3. Volume- and content-based charging: The amount of data sent via a specific IMS session is measured and eventually the type/quality of data. This allows highly differentiated charging models. These measurements can only performed by a server where the data flow is passed through. The here described architecture is focussing on this charging approach. Charging in MM-CLI service should be provided by the MM-CLI server. There are several reasons for this:

When using charging model 1 the callee have to pay for each received MM-CLI business card. He has to pay for the multimedia content which will be delivered from the MM-CLI application server. If the MM-CLI business card is stored on the MM-CLI application server, the caller has only to pay for the little amount of signaling data between the caller and MM-CLI application server. Only in cases where the MM-CLI card is stored on the UE the caller has also to pay for the multimedia content.

Charging model 2 can't also not be used, because there will be no session between UE A and B. Only SIP "MESSAGE" will be exchanged.

The charging model for the MM-CLI service should be similar to the SS7 SMS service, only the caller of the MM-CLI card should pay. The MM-CLI application server could provide a charging module for such an approach.

If both UE's are in different domains and the MM-CLI service is provided in both domains, the "caller party pays" charging model could be realized. In cases there is only one domain that provides the MM-CLI service, two differences can be made: • The caller is in a MM-CLI served domain and the callee isn't: The callee has to pay for the amount of multimedia data that he receives. Depending on charging model in caller domain, the caller has also to pay for the service.

The caller isn't in a MM-CLI served domain and the callee is: In that case the MM-CLI card is stored on the caller UE. Depending on the callee's charging model, only the caller has to pay for the MM-CLI service.

On the basis of the above description some changes may be introduced in the exemplary embodiment by the skilled in the art without departing from the scope of the invention. It is thus contemplated that the present invention encompasses any and all such embodiments covered by the following claims.

The invention claimed is:

1. A method for implementing a calling line identification service (CLI) inside a cellular telephony network comprising a SIP-based infrastructure (IMS) integrated with a core network to provide multimedia services to users via IP, where the network during the ringing time of a phone-call sends to a callee at least a line identity of a caller to be displayed on a screen of the phone before switching on a reply status, comprising:

sending, by the caller at initial instant of the call setup, to a CLI-dedicated application of the IMS, a SIP request known as MESSAGE including SIP URIs of the caller and the callee;

providing, by the CLI-dedicated application, in the MESSAGE at least one of the multimedia content of a pre-customized personal card matching both SIP URIs (business card) and address links to retrieve previously stored components of the multimedia content;

forwarding the MESSAGE to the callee by the CLI-dedicated application; and receiving the MESSAGE on the phone of the callee and obtaining the multimedia content from the MESSAGE or retrieving the components using the address links for rendering and playing the business card.

2. The method of claim 1 wherein the MESSAGE content also includes an identifier of the business card.

3. The method of claim 1, wherein the multimedia content includes at least one of textual information, a picture, a sound file, and a small video clip.

4. The method of claim 1, wherein the callee stores the business cards together with respective identifiers inside an internal cache memor.

5. The method of claim 4, wherein the callee retrieves the business card from the cache memory when an incoming business card identifier matches a stored one.

6. The method of claim 1, wherein the callee sends to the CLI-dedicated application a blacklist of the callers their business cards must not be forwarded.

7. The method of claim 1, wherein the CLI-dedicated application sends back to the caller a business card of the callee.

8. The method of claim 1, wherein the user subscribed to the CLI service:

creating a variety of business cards associating to the business cards their contacts as at least one of personal addresses, buddy lists, group, and respective multimedia contents;

defining different user's profiles associated with the business card by filter criteria including at least one of calling/called party, white/black lists, and the media contents they do not want to receive; and forwarding to the callee a business card matching his user profile.

9. The method of claim 1, wherein the CLI-dedicated application includes an interface to a web portal server which hosts multimedia contents and http links uploaded by the users to create their own business cards.

10. The method of claim 9, wherein the web portal server is accessed from the client application with a specific entry of the option menu.

11. The method of claim 9, wherein after the user has inserted once his credentials he's authenticated for any subsequent access to the web portal server with a cookie.

12. The method of claim 10, wherein the web portal server mounts a specific network file system folder of a streaming platform used to make large video contents available to the business cards.

13. The method of claim 11, wherein components of the multimedia contents are described using an XML body format.

14. The method of claim 12, wherein the callee obtains the multimedia content or retrieves relevant components on an HTTP link with the CLI-dedicated application.

15. A network architecture for implementing an improved calling line identification service (CLI) inside a cellular telephony network including a SIP-based infrastructure (IMS) integrated with a core network to provide multimedia services to users via IP, comprising:

a multimedia CLI-dedicated server (MM-CLI) connected to the IMS and the packet switched domain of the core network;
a control device of the MM-CLI for handling the SIP signalizing flow including a SIP element called MESSAGE and for providing in its body at least one of multimedia contents of a business card or HTTP address link to retrieve components of the multimedia contents;
a storage device of the MM-CLI for storing the multimedia contents of the business cards and/or the HTTP address links;
a web interfacing device of the MM-CLI for allowing end users to download the multimedia components of the business cards through the addressed HTTP links;
a first client application internal to user phones for monitoring a line status of a caller and transmitting the SIP MESSAGE at an initial instant of call setup;
a second client application internal to the user phone for monitoring both the line status of a callee and an incoming SIP stack for synchronizing the CLI information and get or retrieve the multimedia components of the business card; and
a player internal to the user phone for rendering and playing the business cards.

* * * * *